(12) United States Patent
Inoue et al.

(10) Patent No.: US 6,631,795 B2
(45) Date of Patent: Oct. 14, 2003

(54) FLUID COUPLING WITH BAFFLE PLATE

(75) Inventors: Koji Inoue, Hamamatsu (JP); Kousaku Suzuki, Hamamatsu (JP); Yoshihisa Sugimura, Hamamatsu (JP); Hidetaka Koga, Fujisawa (JP); Nobuyuki Iwao, Fujisawa (JP); Yasushi Yamamoto, Fujisawa (JP)

(73) Assignees: Yutaka Giken Co., Ltd., Shizuoka (JP); Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/901,146

(22) Filed: Jul. 10, 2001

(65) Prior Publication Data

US 2002/0029565 A1 Mar. 14, 2002

(30) Foreign Application Priority Data

| Jul. 10, 2000 | (JP) | 2000-213396 |
| Jul. 10, 2000 | (JP) | 2000-213397 |

(51) Int. Cl.⁷ .............................................. F16H 45/02
(52) U.S. Cl. ...................................... 192/3.29; 60/365
(58) Field of Search ............................ 192/3.28, 3.29, 192/3.3; 60/357, 365

(56) References Cited

U.S. PATENT DOCUMENTS

| 2,534,517 A | * | 12/1950 | Jenny | 60/359 |
| 2,943,503 A | | 7/1960 | Forster | |
| 3,260,052 A | * | 7/1966 | Stabler | 60/365 |
| 3,444,761 A | * | 5/1969 | Wickman | 475/66 |
| 3,919,844 A | * | 11/1975 | Elderton | 60/330 |
| 5,279,118 A | * | 1/1994 | Hara et al. | 60/365 |
| 6,012,558 A | * | 1/2000 | Kundermann | 192/3.29 |
| 6,334,307 B1 | * | 1/2002 | Iwao et al. | 60/330 |

FOREIGN PATENT DOCUMENTS

| GB | 384022 | 12/1932 |
| GB | 2 118 643 A | 11/1983 |
| GB | 2 118 692 A | 11/1983 |
| JP | 53-1759 A | * 1/1978 | 60/351 |

OTHER PUBLICATIONS

European Search Report, Application No. EP 01 11 6840, dated Nov. 1, 2001.

* cited by examiner

*Primary Examiner*—Richard M. Lorence
(74) *Attorney, Agent, or Firm*—Arent Fox Kintner Plotkin & Kahn, PLLC (57) ABSTRACT

In a fluid coupling with a baffle plate protruding on the side of an inner peripheral surface of a circulating circuit, a clutch chamber is defined between a back of a turbine impeller and a side cover covering the back of the impeller, to communicate with an outer periphery of the circulating circuit. The clutch chamber is divided by a clutch piston into an inner chamber portion on the side of the turbine impeller and an outer chamber portion on the side of the side cover. The clutch piston is axially movably connected to the turbine impeller, thereby constituting a lock-up clutch, so that a first oil passage leading to the outer chamber portion and a second oil passage leading to an inner periphery of the circulating circuit are put into alternate communication with a discharge portion of an oil pump and with an oil reservoir in a switched manner.

19 Claims, 4 Drawing Sheets

FIG.1

NON-CONNECTED STATE OF LOCK-UP CLUTCH

FIG.2

CONNECTED STATE OF LOCK-UP CLUTCH

FIG.4

CONNECTED STATE OF LOCK-UP CLUTCH

FLUID COUPLING WITH BAFFLE PLATE

BACKGROUND OF THE INVENTION

1. Field of the Invention

The present invention relates to an improvement of a fluid coupling with a baffle plate, comprising a pump impeller connected to an input shaft, a turbine impeller connected to an output shaft disposed coaxially with the input shaft, the pump impeller and the turbine impeller being opposed to each other to define a circulating circuit therebetween, and a baffle plate mounted to at least one of the pump impeller and the turbine impeller to protrude on the side of an inner periphery of the circulating circuit.

2. Description of the Related Art

Such a fluid coupling with the baffle plate is already known.

In such a fluid coupling with the baffle plate, a resistance is provided to the flowing of working oil within the circulating circuit by disposition of the baffle plate, to thereby reduce drag torque. In the known fluid coupling, however, the outside diameter of the baffle plate is set at a large value in order to sufficiently reduce the drag torque, but this configuration provides the following disadvantage: The flowing of working oil within the circulating circuit is obstructed greatly by the baffle plate in a normal rotational speed range, resulting in a large reduction in transmitting efficiency.

SUMMARY OF THE INVENTION

Accordingly, it is an object of the present invention to provide a fluid coupling with a baffle plate, wherein a reduction in drag torque and an improvement in transmitting efficiency can be satisfied simultaneously without the above-mentioned disadvantage.

To achieve the above object, according to a first aspect and feature of the present invention, there is provided a fluid coupling with a baffle plate, comprising a pump impeller connected to an input shaft, a turbine impeller connected to an output shaft, the pump impeller and the turbine impeller being opposed to each other to define a circulating circuit therebetween, and a baffle plate mounted to at least one of the pump impeller and the turbine impeller to protrude on the side of an inner periphery of the circulating circuit, wherein a, clutch chamber is defined between a back of the turbine impeller and a side cover connected to the pump impeller to cover the back of the turbine impeller, the clutch chamber being divided by a clutch piston into an inner chamber portion on the side of the turbine impeller and an outer chamber portion on the side of the side cover, the clutch piston being axially movably connected to the turbine impeller, thereby constituting a lock-up clutch, so that a first oil passage leading to the outer chamber portion and a second oil passage leading to an inner periphery of the circulating circuit are alternately put into communication with a discharge portion of an oil pump and with an oil reservoir in a switched manner. The input shaft and the output shaft correspond respectively to a crankshaft 1 and a main shaft 2 in embodiments of the present invention, which will be described hereinafter.

With the first feature, during idling or extremely low-speed rotation of the input shaft, the working oil discharged by the oil pump is supplied from the first oil passage to the outer chamber portion and the inner chamber portion of the clutch chamber, and into the circulating circuit, thereby bringing the lock-up clutch into a non-connected state to enable the fluid transmission between the pump impeller and the turbine impeller. At that time, however, a drag torque is reduced since the circulation of the working oil within the circulating circuit is obstructed by the baffle plate, thereby easily maintaining the stopped state of the output shaft.

When the input shaft reaches a predetermined rotational speed or more after starting of the fluid transmission, the working oil discharged by the oil pump is supplied from the second oil passage to the circulating circuit and the inner chamber portion of the clutch chamber, and on the other hand, the outer chamber portion is opened to the oil reservoir through the first oil passage, thereby bringing the lock-up clutch into a connected state to connect the pump impeller and the turbine impeller directly to each other. As a result, it is possible to improve the efficiency of transmission of the rotational torque between the input shaft and the output shaft, irrespective of a reduction in efficiency of transmission of the fluid between the impellers due to the baffle plate.

Therefore, it is possible to satisfy both the reduction in drag torque and the improvement in efficiency of transmission of the fluid between the impellers during normal rotation.

According to a second aspect and feature of the present invention, in addition to the first feature, the pump impeller has a hub disposed to surround a hub of the turbine impeller, and the second oil passage is put into communication with the inner periphery of the circulating circuit through a bearing interposed between the hubs.

With the second feature, an accuracy of concentricity between the pump impeller and the turbine impeller can be secured by the bearing, to ensure a smooth relative rotation between the impellers. Moreover, the working oil flowing into and out of the circulating circuit between the impellers can be passed through the bearing, to lubricate the bearing effectively. Moreover, the working oil flows along the hubs of the pump impeller and the turbine impeller as well as the baffle plate and hence, can cool them effectively. Further, the bearing also serves as a communication passage between the circulating circuit and the second oil passage, which can contribute to simplification of the arrangement of the oil passages.

According to a third aspect and feature of the present invention, in addition to the first or second feature, the baffle plate is connected to the hub of the turbine impeller, and the second oil passage is put into communication with an entrance of the pump impeller within the circulating circuit.

With the third feature, the entrance of the pump impeller, with which the second oil passage communicates, is at a location under a relatively low pressure within the circulating circuit. Therefore, the working oil can be supplied smoothly from the second oil passage to the circulating circuit, to contribute to an improvement in responsiveness to bring the lock-up clutch into a connected state.

According to a fourth aspect and feature of the present invention, in addition to the first or second feature, the baffle plate is connected to the hub of the pump impeller, and the second oil passage is put into communication with an exit of the turbine impeller within the circulating circuit.

With the fourth feature, the exit of the turbine impeller, with which the second oil passage communicates, is at a location under a relatively high pressure within the circulating circuit. Therefore, the flowing of the working oil from the circulating circuit to the second oil passage can be conducted smoothly in the non-connected state of the lock-up clutch, to provide an improvement in responsiveness to bring the lock-up clutch into a non-connected state, and to effectively cool the fluid coupling.

According to a fifth aspect and feature of the present invention, in addition to the fourth feature, the second oil passage is also put into communication with the entrance of the pump impeller within the circulating circuit.

With the fifth feature, the flowing of the working oil from the circulating circuit to the second oil passage can be conducted smoothly in the non-connected state of the lock-up clutch, to effectively cool the fluid coupling. When the working oil is supplied from the second oil passage to the circulating circuit, such supplying can be conducted smoothly, which can contribute to an improvement in responsiveness to bring the lock-up clutch into a connected state.

According to a sixth aspect and feature of the present invention, in addition to the first feature, the pump impeller has a hub disposed to surround a hub of the turbine impeller; a ball bearing is interposed between both the hubs to axially connect the hubs to each other; the circulating circuit and the second oil passage are put into communication with each other through the bearing; and the output shaft is spline-fitted to the hub of the turbine impeller and rotatably fitted to a hub of the side cover.

With the sixth feature, the ball bearing is interposed between the hub of the turbine impeller and the hub of the pump impeller surrounding the hub of the turbine impeller, and the hubs of the impellers are axially connected to each other through the ball bearing. Therefore, an assembly comprising the pump impeller, the turbine impeller and the side cover can be constituted with a highly accurate concentricity provided to the hubs of the pump impeller, the turbine impeller and the side cover. Thus, it is possible to easily conduct the operation of fitting the output shaft to the hubs of the turbine impeller and the side cover. Moreover, the disposition of the hub of the pump impeller to surround the hub of the turbine impeller can contribute to a reduction in axial dimension of the fluid coupling, to increase the degree of freedom of the layout in the vehicle.

Further, the hub of the pump impeller is carried on the hub of the turbine impeller with the ball bearing interposed therebetween and hence, the fitting of the output to the hub of the pump impeller is not required. Thus, it is also possible to remarkably improve the operability of mounting the output shaft.

Yet further, the highly accurate concentricity is provided to the pump impeller and the turbine impeller and hence, the smooth relative rotation between them can be ensured, and the stable coupling function can be exhibited.

In addition, since the circulating circuit and the second oil passage are put into communication with each other through the ball bearing, the working oil flowing into and out of the circulating oil is necessarily passed through the ball bearing and can lubricate the bearing effectively. Moreover, the ball bearing also serves as the communication passage between the circulating circuit and the second oil passage and hence, the arrangement of the oil passages can be simplified, thereby providing a reduction in processing steps and, in turn, a reduction in cost.

According to a seventh aspect and feature of the present invention, in addition to the sixth feature, the ball bearing has an inner race which is fitted over an outer peripheral surface of the hub of the turbine impeller and axially clamped by an annular shoulder of the hub and a stop ring locked to the hub, and an outer race which is fitted to an inner peripheral surface of the hub of the pump impeller and clamped by an annular shoulder of the hub and a stop ring locked to the hub.

With the seventh feature, it is easy to axially connect the ball bearing with the hubs of the pump impeller and the turbine impeller, thereby easily constituting a fluid coupling assembly.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of embodiments with reference to the accompanying drawings.

Figure 1:
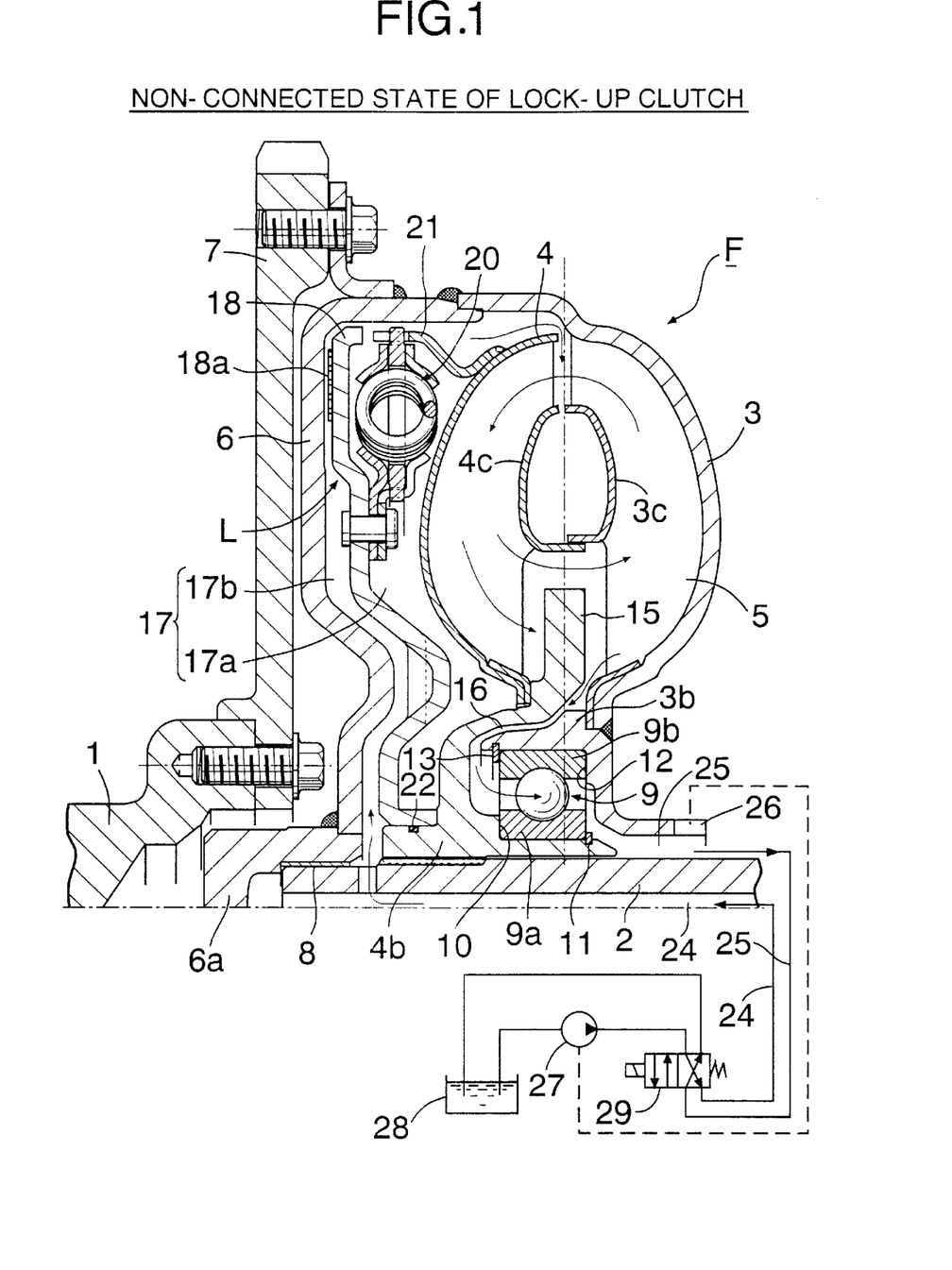
FIG. 1 is a vertical sectional view of a fluid coupling with a baffle plate according to a first embodiment of the present invention, shown in a non-connected state of a lock-up clutch.
Figure 2:
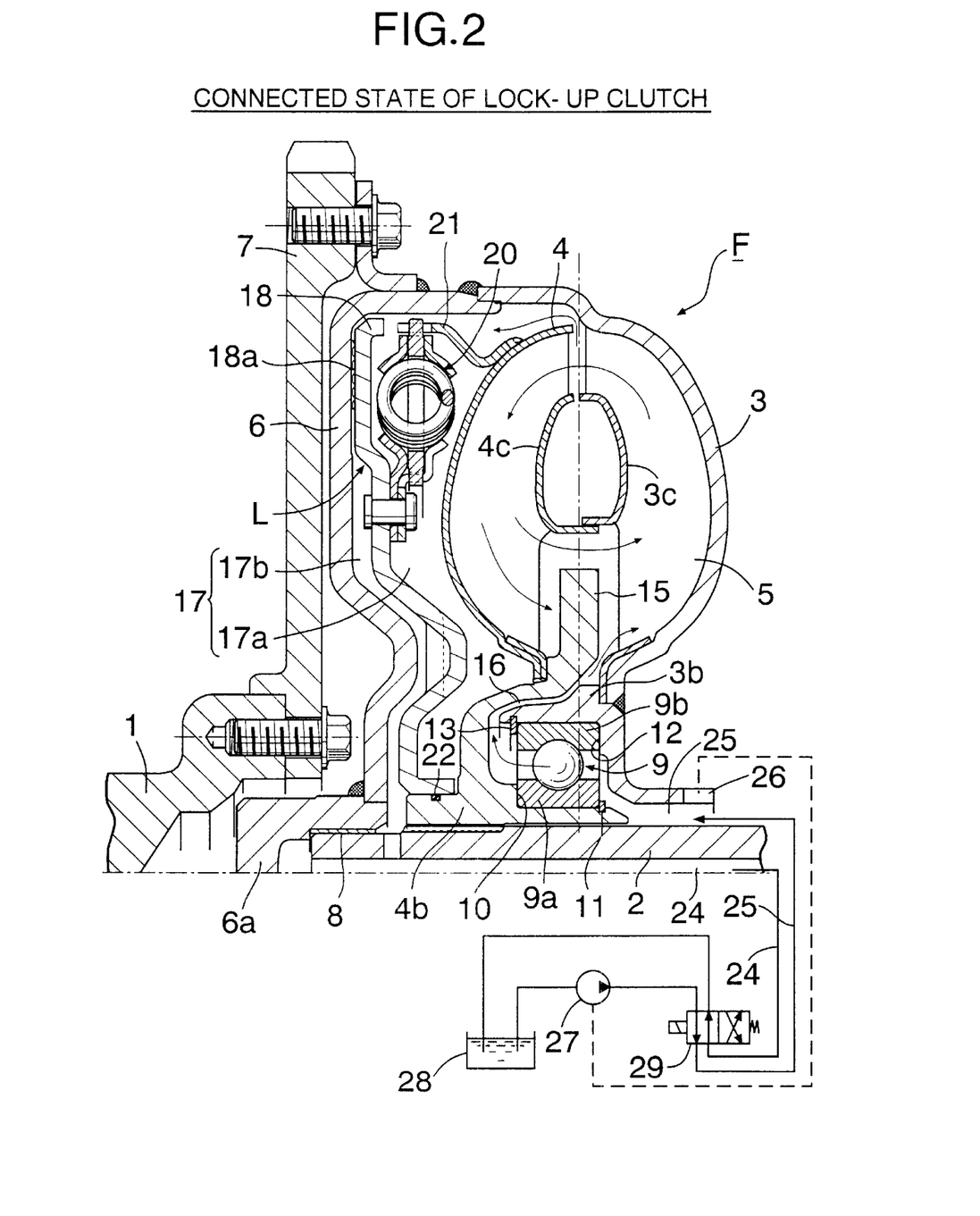
FIG. 2 is a view showing the fluid coupling in a connected state of the lock-up clutch for explaining the operation.

A first embodiment of the present invention shown in FIGS. 1 and 2 will be first described.

A crankshaft 1 of an engine for an automobile and a main shaft 2 of a multi-stage transmission are disposed coaxially with each other and connected to each other through a fluid coupling F.

The fluid coupling F includes a pump impeller 3, and a turbine impeller 4 opposed to the pump impeller 3 to define a working oil-circulating circuit 5 between the turbine impeller 4 and the pump impeller 3. The impellers 3 and 4 have core rings 3c and 4c, respectively, which are opposed to each other at a central portion of the circulating circuit 5. The core ring 4c of the turbine impeller 4 has an inner peripheral wall disposed inside and in proximity to an inner peripheral wall of the core ring 3c of the pump impeller 3. This arrangement ensures that when working oil flows within the circulating circuit 5 from the turbine impeller 4 toward the pump impeller 3, a reduction in transmitting efficiency due to the oil entering inside the core rings 3c and 4c can be prevented.

A side cover 6 is connected to the pump impeller 3 to cover a back of the turbine impeller 4, and a flywheel 7 secured to an end of the crankshaft 1 is connected to the side cover 6.

A hub 6a is formed at a central portion of the side cover 6, and the main shaft 2 spline-coupled to a hub 4b of the turbine impeller 4 is rotatably carried at its end on the hub 6a with a bush 8 interposed therebetween.

The pump impeller 3 has a hub 3b disposed to surround the hub 4b of the turbine impeller 4 on the side of an inner periphery of the circulating circuit 5, and a ball bearing 9 is interposed between the hubs 3b and 4b. In this case, an inner race 9a of the ball bearing 9 is fitted over an outer peripheral surface of the hub 4b and axially clamped by an annular shoulder 10 of the hub 4b and a stop ring 11 locked to the hub 4b. An outer race 9b of the ball bearing 9 is fitted to an inner peripheral surface of the hub 3b and axially clamped by an annular shoulder 12 of the hub 3b and an stop ring 13 locked to the hub 3b. In this manner, the hubs 3b and 4b of the pump impeller 3 and the turbine impeller 4 are axially connected to each other through the ball bearing 9. The ball bearing 9 is not sealed, so that the working oil can flow between the inner and outer races 9a and 9b.

An annular baffle plate 15 protruding from the inner periphery of the circulating circuit 5 toward the core ring 4c is integrally connected to the turbine impeller 4, and an annular oil passage 16 is provided between a base portion of the baffle plate 15 and the hub 3b of the pump impeller 3. The oil passage 16 has an inner peripheral end communicating with an end face of the ball bearing 9 on the side of the turbine impeller 4, and an outer peripheral end which opens into an entrance of the pump impeller 3 within the circulating circuit 5.

A lock-up clutch L is mounted between the turbine impeller 4 and the side cover 6, and capable of coupling them directly to each other. The lock-up clutch L is comprised of a clutch chamber 17 defined between the back of the turbine impeller 4 and an inner wall of the side cover 6 and designed to serve as an oil chamber communicating with the circulating circuit 5, and a clutch piston 18 disposed to divide the clutch chamber 17 into an inner chamber portion 17a on the side of the turbine impeller 4 and an outer chamber portion 17b on the side cover 6. The clutch piston 18 has a friction lining 18a on its end face opposed to the inner wall of the side cover 6.

The clutch piston 18 is connected to a plurality of transmitting claws 21 projectingly provided on the back of the turbine impeller 4 through a torque damper 20, and slidably carried on the outer peripheral surface of the hub 4b of the turbine impeller 4 with a seal member 22 interposed therebetween so that the clutch piston 18 can be moved axially between a connected position in which the friction lining 18a is in pressure contact with the inner wall of the side cover 6, and a non-connected position in which the friction lining 18a is spaced apart from the inner wall.

The main shaft 2 is provided with a first oil passage 24 communicating with the outer chamber portion 17b of the lock-up clutch L. A cylindrical oil pump-driving shaft 26 is integrally formed on the hub 3b of the pump impeller 3 and positioned to surround the main shaft 2 to drive an oil pump 27. A second oil passage 25 is defined between the oil pump-driving shaft 26 and the main shaft 2 to communicate with the other end face of the ball bearing 9. Thus, the second oil passage 25 and the circulating circuit 5 are in communication with each other through the ball bearing 9 and the annular oil passage 16.

The first and second oil passages 24 and 25 are adapted to be alternately connected to a discharge portion of the oil pump 27 and an oil reservoir 28 though a switchover valve 29.

The operation of the first embodiment will be described below.

During idling of the engine or in an extremely low-speed operational range of the engine, the switchover valve 29 is controlled by an electronic control unit (not shown) to connect the first oil passage 24 to the discharge portion of the oil pump 27 and to connect the second oil passage 25 to the oil reservoir 28, as shown in FIG. 1. Therefore, when a rotational torque of the crankshaft 1 of the engine is transmitted through the flywheel 7 and the side cover 6 to the pump impeller 3 to drive the pump impeller 3, and further drive the oil pump 27, the working oil discharged from the oil pump 27 is permitted to flow through the switchover valve 29, the first oil passage 24 and the outer and inner chamber portions 17b and 17a of the clutch chamber 17 into the circulating circuit 5 to fill the circuit 5, and is then passed sequentially via the annular passage 16 and the ball bearing 9 into the second oil passage 25 and then the switchover valve 29, and returns to the oil reservoir 28.

In the clutch chamber 17, the pressure in the outer chamber portion 17b is higher than that in the inner chamber portion 17a as a result of the flowing of the working oil as described above, and the clutch piston 18 is urged away from the inner wall of the side cover 6 by a difference between the pressures in the outer and inner chamber portions 17b and 17a. Therefore, the lock-up clutch L is in a non-connected state to permit the relative rotation between the pump impeller 3 and the turbine impeller 4. Thus, when the pump impeller 3 is driven to rotate by the crankshaft 1, the working oil filling the circulating circuit 5 is about to be circulated within the circulating circuit 5 as indicated by arrows, thereby transmitting the rotational torque of the pump impeller 3 to the turbine impeller 4. However, the baffle plate 15 interposed in the circulating circuit 5 obstructs the circulation of the working oil within the circulating circuit 5 to reduce a drag torque, thereby easily maintaining the main shaft 2 in a stopped state.

If the rotational speed of the crankshaft 1 is increased to start a vehicle, the rotational speed of the pump impeller 3 is increased accordingly, whereby the transmission of the fluid from the pump impeller 3 to the turbine impeller 4 becomes active and hence, the turbine impeller 4 is rotated to drive the main shaft 2, thus enabling a smooth starting of the vehicle.

When the rotational speed of the engine reaches a predetermined value or more after the starting of the vehicle, the second oil passage 25 is connected to the discharge portion of the oil pump 27 and the first oil passage 24 is connected to the oil reservoir 28, as shown in FIG. 2, by switching-over of the switchover valve 28 controlled by the electronic control unit (not shown). As a result, the working oil discharged from the oil pump 27 adversely flow from the switchover valve 29 sequentially through the second oil passage 25, the ball bearing 9 and the annular oil passage 16 into the circulating circuit 5 to fill the circuit 5, and then enters the inner chamber portion 17a of the clutch chamber 17 to fill the chamber portion 17a. On the other hand, the outer chamber portion 17b of the clutch chamber 17 is opened to the oil reservoir 28 through the first oil passage 24 and the switchover valve 29 and hence, in the clutch chamber 17, the pressure in the inner chamber portion 17a is higher than that in the outer chamber portion 17b. Therefore, the clutch piston 18 is urged toward the side cover 6 by a difference between the pressures in the chamber portions 17a and 17b, so that the friction lining 18a is brought into pressure contact with the inner wall of the side cover 6, thus bringing the lock-up clutch L into a connected state.

Such connection of the lock-up clutch L connects the pump impeller 3 and the turbine impeller 4 directly to each other. Therefore, it is possible to transmit the rotational torque of the crankshaft 1 to the main shaft 2 with a good efficiency, irrespective of a reduction in fluid transmitting efficiency caused by the baffle plate 15, i.e., to provide a state of a high transmitting efficiency leading to a reduction in fuel consumption.

Thus, it is possible to satisfy both a reduction in drag torque and an increase in transmitting efficiency between both the impellers 3 and 4 during normal operation of the engine.

In addition, the working oil is circulated between the circulating circuit 5 and the second oil passage 25 through the ball bearing 9 and the annular oil passage 16 and hence, it is possible to effectively promote cooling of the fluid coupling F and lubrication of the ball bearing 9. Particularly, since the annular oil passage 16 opens into the entrance of the pump impeller 3 having a relatively low pressure within the circulating circuit 5, the working oil can be supplied smoothly from the second oil passage through the ball bearing 9 and the annular oil passage 16 to the circulating circuit 5, as in the case shown in FIG. 2, leading to an improved responsiveness to the connected state of the lock-up clutch L.

The working oil passing through the ball bearing 9 and the annular oil passage 16 flows along the hubs 3b and 4b of the pump and turbine impellers 3 and 4 as well as the baffle plate 15 and hence, can also effectively cool them.

The ball bearing 9 also serves as a communication passage between the circulating circuit 5 and the second oil passage and hence, the arrangement of the oil passages is simplified and thus, it is possible to provide a reduction in number of processing steps and, in turn, a reduction in cost.

Further, since the ball bearing 9 is interposed between the hub 4b of the turbine impeller 4 and the hub 3b of the pump impeller 3 surrounding the hub 4b, and the hubs of the impellers 3 and 4 are axially connected to each other through the ball bearing 9, a fluid coupling assembly can be constituted with a highly accurate concentricity provided to the hubs 3a, 4a and 6a of the pump impeller 3, the turbine impeller 4 and the side cover 6. Therefore, the fitting of the main shaft 2 to the hubs 4b and 6b of the turbine impeller 4 and the side cover 6 can be conducted easily. Moreover, the hub 3b of the pump impeller 3 is supported on the hub 4b of the turbine impeller 4 and hence, the fitting of the main shaft 2 to the hub 3b of the pump impeller 3 is not required. Thus, it is possible to remarkably improve the operability for mounting the main shaft 2.

Furthermore, the axial dimension of the fluid coupling F can be reduced by the disposition of the hub 3b of the pump impeller 3 to surround the hub 4b of the turbine impeller 4, thereby increasing the degree of freedom of the layout in the vehicle.

Moreover, the pump impeller 3 and the turbine impeller 4 are disposed at a highly accurate concentricity provided by the ball bearing 9 and hence, the smooth relative rotation therebetween can be ensured, and stable coupling function can be exhibited.

A second embodiment of the present invention will be described below with reference to FIGS. 3 and 4.

In the second embodiment, the baffle plate 15 is integrally connected to the hub 3b of the pump impeller 3, and an annular oil passage 30 is provided between the hub 3b of the pump impeller 3 and the hub 4b of the turbine impeller 4 and opens into an exit of the turbine impeller 4 within the circulating circuit 5. The annular oil passage 30 is in communication with the second oil passage 25 through the ball bearing 9.

A plurality of radial oil passages 31 are provided to permit the second oil passage 25 to communicate with an entrance of the pump impeller 3 within the circulating circuit 5.

Figure 3:
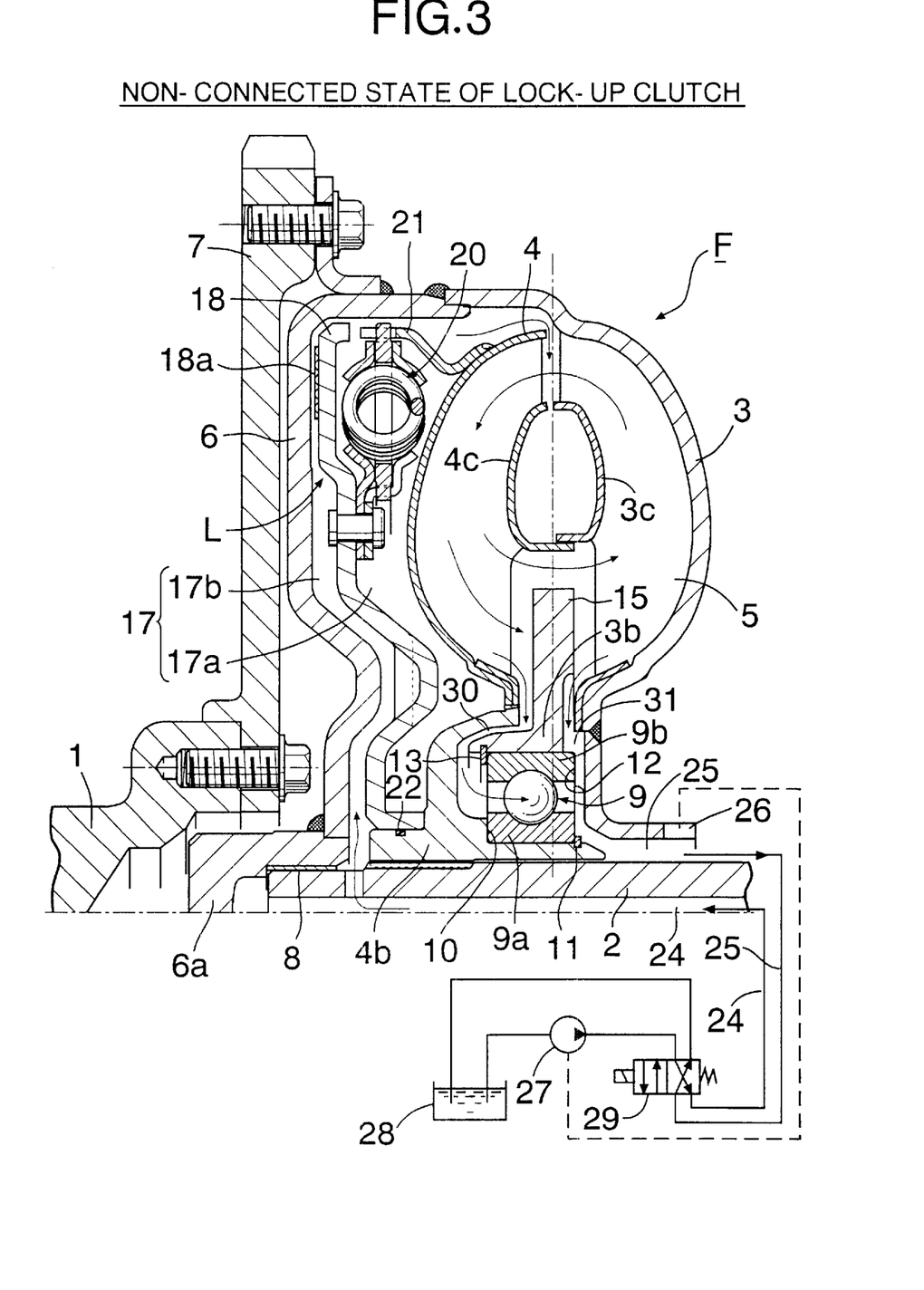
FIG. 3 is a vertical sectional view of a fluid coupling with a baffle plate according to a second embodiment of the present invention, shown in a non-connected state of a lock-up clutch.

In the non-connected state of the lock-up clutch L shown in FIG. 3, the working oil having flowed from the first oil passage 24 into the outer and inner chamber portions 17b and 17a of the clutch chamber 17 and the circulating circuit 5, passes through both a flow path extending from the exit of the turbine impeller 4 to the annular oil passage 30 and a flow path extending from the entrance of the pump impeller 3 to the radial oil passages 31, to flow into the second oil passage 25.

Particularly, the exit of the turbine impeller 4, into which the annular oil passage 30, is at a location under a relatively high pressure within the circulating circuit 5. Therefore, the flowing of the working oil from the circulating circuit 5 into the annular oil passage 30 can be promoted to provide an improvement in responsiveness to bring the lock-up clutch L into the non-connected state, and to effectively conduct the cooling of the fluid coupling F. Moreover, the working oil is directed through the ball bearing 9 to the second oil passage 25 and hence, also can lubricate the bearing 9.

The entrance of the pump impeller 3, into which the radial oil passages 31 open, is at a location under a relatively low pressure within the circulating circuit. Therefore, when the working oil is supplied from the second oil passage through the radial oil passages 31 into the circulating circuit 5, as shown in FIG. 4, the supplying can be achieved smoothly to improve the responsiveness to bring the lock-up clutch L into a connected state.

Figure 4:
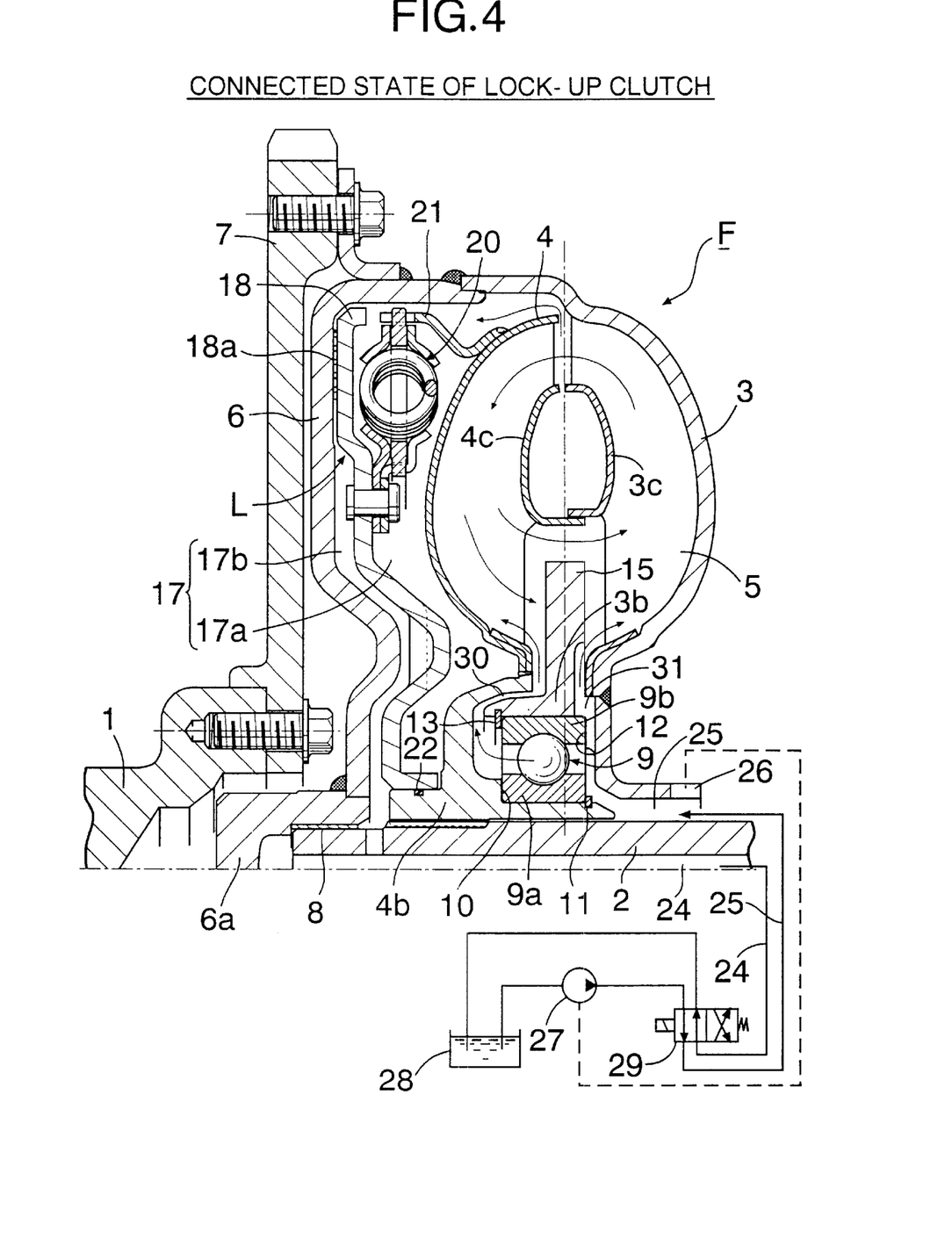
FIG. 4 is a view showing the fluid coupling in a connected state of the lock-up clutch for explaining-the operation.

The other parts of construction are similar to those in the first embodiment and hence, portions or components in FIGS. 3 and 4 corresponding to those in the first embodiment are designated by the same reference numerals, and the description thereof is omitted.

Although the embodiments of the present invention have been described in detail, it will be understood that the present invention is not limited to the above-described embodiments, and various modifications in design may be made without departing from the spirit and scope of the invention defined in claims.

For example, in the first embodiment shown in FIG. 1, the baffle plate 15 may be formed separately from the hub 4b of the turbine impeller 4 and coupled to the hub 4b by welding or the like. Even in the second embodiment shown in FIG. 3, the baffle plate 15 may be formed separately from the hub 3b of the pump impeller 3 and coupled to the hub 3b by welding or the like. In place of the ball bearing 9, another type of bearing permitting working oil to flow therethrough may be used.

As described above, according to the present invention, it is possible to satisfy both a reduction in drag torque and an improvement in efficiency of transmission between both the impellers which are in normal rotation, by switching the communications of the first and second oil passages with the oil pump and the oil reservoir from one to the other.

In addition, according to the present invention, by disposing the hub of the pump impeller to surround the hub of the turbine impeller and permitting the second oil passage to communicate with the inner periphery of the circulating circuit through the bearing interposed between the hubs, the accuracy of the concentricity between the pump impeller and the turbine impeller can be secured by the bearing, to thereby ensure the smooth relative rotation between the impellers. Moreover, the working oil flowing into and out of the circulating circuit between both the impellers can be passed through the bearing, thereby lubricating the impellers effectively, but also the working oil can flow along the hubs of the pump impeller and the turbine impeller as well as the baffle plate, thereby cooling them effectively. The ball bearing also serves as a communication passage between the circulating circuit and the second oil passage and hence, thereby contributing to a simplification in arrangement of the oil passages.

Further, according to the present invention, the working oil can be supplied smoothly from the second oil passage to the circulating circuit by connecting the baffle plate to the hub of the turbine impeller and putting the second oil passage into communication with the entrance of the pump impeller within the circulating circuit. This can contribute to an improvement in responsiveness to bring the lock-up clutch into a connected state.

Still further, according to the present invention, the outflow of the working oil from the circulating circuit into the second oil passage can be conducted smoothly in the non-connected state of the lock-up clutch by connecting the baffle plate to the hub of the turbine impeller and putting the second oil passage into communication with the exit of the turbine impeller within the circulating circuit. This can provide an improvement in responsiveness to bring the lock-up clutch into a non-connected state as well as an effective cooling of the lock-up clutch.

Still further, according to the present invention, the flowing of the working oil from the circulating circuit into the second oil passage can be conducted smoothly in the non-connected state of the lock-up clutch by putting the second oil passage also to the entrance of the pump impeller, to thereby cool the fluid coupling effectively. When the working oil is supplied from the second oil passage to the circulating circuit, such supplying can be conducted smoothly to contribute to an improvement in responsiveness to bring the lock-up clutch into the connected state.

Still further, according to the present invention, it is possible to construct an assembly comprising the pump impeller, the turbine impeller and the side cover, while providing a highly accurate concentricity to them. Therefore, it is possible to easily conduct the operation of fitting the output shaft to the turbine impeller and the side cover. Moreover, the fitting of the output shaft to the hub of the pump impeller is not required and hence, it is possible to improve the operability of mounting the output shaft remarkably. Furthermore, the disposition of the hub of the pump impeller to surround the hub of the turbine impeller can contribute to a reduction in axial dimension of the fluid coupling, to thereby increase the degree of freedom of the layout in the vehicle. In addition, since the highly accurate concentricity is provided to the pump impeller and the turbine impeller by the ball bearing, the smooth relative rotation between the impellers can be ensured, and the stable coupling function can be exhibited.

Still further, since the circulating circuit and the second oil passage are put into communication with each other through the ball bearing, the working oil flowing into and out of the circulating circuit is necessarily passed through the ball bearing and can lubricate the ball bearing effectively. Moreover, since the ball bearing also serves as a communication passage between the circulating circuit and the second oil passage, the arrangement of the oil passages can be simplified, thereby providing a reduction in processing steps and, in turn, a reduction in cost.

Still further, according to the present invention, while the inner race of the ball bearing is fitted over the outer peripheral surface of the hub of the turbine impeller and clamped axially by the annular shoulder of the hub and stop ring locked to the hub, the outer race of the ball bearing is fitted to the inner peripheral surface of the pump impeller and clamped axially by the annular shoulder of the hub and the stop ring locked to the hub. Thus, it is possible to easily connect the ball bearing and the hubs of the pump impeller and the turbine impeller axially to each other, thereby easily constructing the assembly of them.

What is claimed is:

1. A fluid coupling with a baffle plate, comprising a pump impeller connected to an input shaft, a turbine impeller connected to an output shaft, said pump impeller and said turbine impeller being opposed to each other to define a circulating circuit therebetween, and a baffle plate mounted to at least one of said impellers to protrude on the side of an inner periphery of said circulating circuit, wherein said turbine and pump impellers include a turbine core ring and a pump core ring, respectively, disposed opposite each other and in a central portion of said circulating circuit above said baffle plate, wherein a clutch chamber is defined between a back of said turbine impeller and a side cover which is connected to said pump impeller to cover the back of said turbine impeller, said clutch chamber communicating with an outer periphery of said circulating circuit and being divided by a clutch piston into an inner chamber portion on the side of said turbine impeller and an outer chamber portion on the side of said side cover, said clutch piston being axially movably connected to said turbine impeller, to define a lock-up clutch, wherein a first oil passage leading to said outer chamber portion and a second oil passage leading to an inner periphery of said circulating circuit are alternately put into communication with a discharge portion of an oil pump and with an oil reservoir, and wherein said pump impeller has a hub disposed to surround a hub of said turbine impeller; a ball bearing is interposed between said hubs to axially connect said hubs to each other; and said circulating circuit and said second oil passage are put into communication with each other through said bearing.

2. A fluid coupling with a baffle plate according to claim 1, wherein said baffle plate is connected to the hub of said turbine impeller, and said second oil passage is put into communication with an entrance of said pump impeller within said circulating circuit.

3. A fluid coupling with a baffle plate according to claim 1, wherein said baffle plate is connected to the hub of said pump impeller, and said second oil passage is put into communication with an exit of said turbine impeller within said circulating circuit.

4. A fluid coupling with a baffle plate according to claim 3, wherein said second oil passage is also put into communication with the entrance of said pump impeller within said circulating circuit.

5. A fluid coupling with a baffle plate according to claim 1, wherein said ball bearing has an inner race which is fitted over an outer peripheral surface of the hub of said turbine impeller and axially clamped by an annular shoulder of said hub and a stop ring locked to said hub, and an outer race which is fitted to an inner peripheral surface of the hub of said pump impeller and clamped by an annular shoulder of said hub and a stop ring locked to said hub.

6. A fluid coupling with a baffle plate according to claim 5, wherein said baffle plate is connected to the hub of said turbine impeller, and said second oil passage is put into communication with an entrance of said pump impeller within said circulating circuit.

7. A fluid coupling with a baffle plate according to claim 5, wherein said baffle plate is connected to the hub of said pump impeller, and said second oil passage is put into communication with an exit of said turbine impeller within said circulating circuit.

8. A fluid coupling with a baffle plate according to claim 7, wherein said second oil passage is also put into communication with the entrance of said pump impeller within said circulating circuit.

9. A fluid coupling with a baffle plate according to claim 5, wherein said turbine core ring has an inner peripheral wall disposed proximal an inner peripheral wall of said pump core ring.

10. A fluid coupling with a baffle plate according to claim 1, wherein said turbine core ring has an inner peripheral wall disposed proximal an inner peripheral wall of said pump core ring.

11. A fluid coupling with a baffle plate according to claim 1, wherein said output shaft is spline-fitted to the hub of said turbine impeller and rotatably fitted to a hub of said side cover.

12. A fluid coupling with a baffle plate, comprising a pump impeller connected to an input shaft, a turbine impeller connected to an output shaft, said pump impeller and said turbine impeller being opposed to each other to define a circulating circuit therebetween, and a baffle plate mounted to at least one of said impellers to protrude on the side of an inner periphery of said circulating circuit, wherein a clutch chamber is defined between a back of said turbine impeller and a side cover which is connected to said pump impeller to cover the back of said turbine impeller, said clutch chamber communicating with an outer periphery of said circulating circuit and being divided by a clutch piston into an inner chamber portion on the side of said turbine impeller and an outer chamber portion on the side of said side cover, said clutch piston being axially movably connected to said turbine impeller, to define a lock-up clutch, wherein a first oil passage leading to said outer chamber portion and a second oil passage leading to an inner periphery of said circulating circuit are alternately put into communication with a discharge portion of an oil pump and with an oil reservoir, and wherein said pump impeller has a hub disposed to surround a hub of said turbine impeller; a ball bearing is interposed between said hubs to axially connect said hubs to each other; said circulating circuit and said second oil passage are put into communication with each other through said bearing; and said output shaft is spline-fitted to the hub of said turbine impeller and rotatably fitted to a hub of said side cover.

13. A fluid coupling with a baffle plate according to claim 12, wherein said baffle plate is connected to the hub of said turbine impeller, and said second oil passage is put into communication with an entrance of said pump impeller within said circulating circuit.

14. A fluid coupling with a baffle plate according to claim 12, wherein said baffle plate is connected to the hub of said pump impeller, and said second oil passage is put into communication with an exit of said turbine impeller within said circulating circuit.

15. A fluid coupling with a baffle plate according to claim 14, wherein said second oil passage is also put into communication with the entrance of said pump impeller within said circulating circuit.

16. A fluid coupling with a baffle plate, comprising a pump impeller connected to an input shaft, a turbine impeller connected to an output shaft, said pump impeller and said turbine impeller being opposed to each other to define a circulating circuit therebetween, and a baffle plate mounted to at least one of said impellers to protrude on the side of an inner periphery of said circulating circuit, wherein a clutch chamber is defined between a back of said turbine impeller and a side cover which is connected to said pump impeller to cover the back of said turbine impeller, said clutch chamber communicating with an outer periphery of said circulating circuit and being divided by a clutch piston into an inner chamber portion on the side of said turbine impeller and an outer chamber portion on the side of said side cover, said clutch piston being axially movably connected to said turbine impeller, to define a lock-up clutch, wherein a first oil passage leading to said outer chamber portion and a second oil passage leading to an inner periphery of said circulating circuit are alternately put into communication with a discharge portion of an oil pump and with an oil reservoir, wherein said pump impeller has a hub disposed to surround a hub of said turbine impeller; a ball bearing is interposed between said hubs to axially connect said hubs to each other; said circulating circuit and said second oil passage are put into communication with each other through said bearing; and said output shaft is spline-fitted to the hub of said turbine impeller and rotatably fitted to a hub of said side cover, and wherein said ball bearing has an inner race which is fitted over an outer peripheral surface of the hub of said turbine impeller and axially clamped by an annular shoulder of said hub and a stop ring locked to said hub, and an outer race which is fitted to an inner peripheral surface of the hub of said pump impeller and clamped by an annular shoulder of said hub and a stop ring locked to said hub.

17. A fluid coupling with a baffle plate according to claim 16, wherein said baffle plate is connected to the hub of said turbine impeller, and said second oil passage is put into communication with an entrance of said pump impeller within said circulating circuit.

18. A fluid coupling with a baffle plate according to claim 16, wherein said baffle plate is connected to the hub of said pump impeller, and said second oil passage is put into communication with an exit of said turbine impeller within said circulating circuit.

19. A fluid coupling with a baffle plate according to claim 18, wherein said second oil passage is also put into communication with the entrance of said pump impeller within said circulating circuit.

* * * * *